(12) United States Patent
Shinbata

(10) Patent No.: US 7,724,934 B2
(45) Date of Patent: May 25, 2010

(54) GRADATION CONVERSION PROCESSING

(75) Inventor: Hiroyuki Shinbata, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1139 days.

(21) Appl. No.: 10/428,751

(22) Filed: May 5, 2003

(65) Prior Publication Data

US 2003/0210831 A1    Nov. 13, 2003

(30) Foreign Application Priority Data

May 10, 2002 (JP) .............................. 2002-136018
Apr. 11, 2003 (JP) .............................. 2003-108009

(51) Int. Cl.
*G06K 9/00* (2006.01)
(52) U.S. Cl. ...................... 382/132; 382/274
(58) Field of Classification Search ............... 382/132
See application file for complete search history.

(56) References Cited

U.S. PATENT DOCUMENTS

| | | | | |
|---|---|---|---|---|
| 4,851,984 A | * | 7/1989 | Doi et al. | 382/108 |
| 4,870,694 A | * | 9/1989 | Takeo | 382/128 |
| 4,992,663 A | * | 2/1991 | Takeo | 250/587 |
| 5,055,682 A | * | 10/1991 | Takeo | 250/587 |
| 5,068,788 A | * | 11/1991 | Goodenough et al. | 382/131 |
| 5,068,907 A | * | 11/1991 | Takeo | 382/132 |
| 5,224,177 A | * | 6/1993 | Doi et al. | 382/168 |
| 5,450,502 A | * | 9/1995 | Eschbach et al. | 382/169 |
| 5,480,439 A | * | 1/1996 | Bisek et al. | 128/898 |
| 5,533,084 A | * | 7/1996 | Mazess | 378/54 |
| 5,537,485 A | * | 7/1996 | Nishikawa et al. | 382/130 |
| 5,544,258 A | * | 8/1996 | Levien | 382/169 |
| 5,577,089 A | * | 11/1996 | Mazess | 378/54 |
| 5,638,458 A | * | 6/1997 | Giger et al. | 382/132 |
| 5,715,326 A | * | 2/1998 | Ortyn et al. | 382/128 |
| 5,862,249 A | * | 1/1999 | Jang et al. | 382/132 |
| 5,930,327 A | * | 7/1999 | Lin | 378/62 |
| 5,970,164 A | * | 10/1999 | Bamberger et al. | 382/128 |
| 5,982,915 A | * | 11/1999 | Doi et al. | 382/130 |
| 6,249,590 B1 | * | 6/2001 | Young et al. | 382/103 |
| 6,594,380 B2 | * | 7/2003 | Shinbata | 382/132 |
| 6,633,657 B1 | * | 10/2003 | Kump et al. | 382/128 |
| 6,850,634 B1 | * | 2/2005 | Shinbata | 382/132 |
| 6,853,740 B1 | * | 2/2005 | Shinbata | 382/132 |
| 7,013,035 B2 | | 3/2006 | Shinbata | 382/132 |
| 7,050,648 B1 | | 5/2006 | Shinbata | 382/274 |
| 7,088,851 B2 | * | 8/2006 | Shinbata | 382/132 |
| 7,359,541 B2 | * | 4/2008 | Kawano | 382/132 |

(Continued)

FOREIGN PATENT DOCUMENTS

JP    7-131653    5/1995

(Continued)

*Primary Examiner*—Sath V Perungavoor
(74) *Attorney, Agent, or Firm*—Fitzpatrick, Cella, Harper & Scinto

(57) ABSTRACT

In gradation conversion of a radiographic image, a pixel value range in an object area as a pixel value width, a representative pixel value of the object, and a curved line of the gradation conversion such that the pixel value width is adjusted to a predetermined width and the representative pixel value is adjusted to a predetermined pixel value, are extracted, and a gradation converting step is performed, of performing conversion on the image, based on the curved line of the gradation conversion.

1 Claim, 7 Drawing Sheets

U.S. PATENT DOCUMENTS

| | | | |
|---|---|---|---|
| 7,508,969 B2 * | 3/2009 | Shinbata | 382/132 |
| 2002/0031246 A1 * | 3/2002 | Kawano | 382/132 |
| 2002/0085743 A1 * | 7/2002 | Kawano | 382/132 |
| 2002/0154800 A1 * | 10/2002 | Shinbata | 382/132 |
| 2003/0169912 A1 * | 9/2003 | Shinbata | 382/131 |
| 2003/0210831 A1 * | 11/2003 | Shinbata | 382/274 |
| 2005/0036670 A1 | 2/2005 | Shinbata | 382/132 |
| 2005/0135665 A1 | 6/2005 | Shinbata | 382/132 |
| 2005/0220356 A1 | 10/2005 | Shinbata et al. | 382/254 |

FOREIGN PATENT DOCUMENTS

| | | |
|---|---|---|
| JP | 2000-101841 | 4/2000 |
| JP | 2000-271108 | 10/2000 |
| JP | 2001-212135 | 8/2001 |

* cited by examiner

GRADATION CONVERSION PROCESSING

BACKGROUND OF THE INVENTION

1. Field of the Invention

The present invention relates to an image processing technique for performing gradation conversion of an image.

2. Description of the Related Art

Before an image radiographed by a radiographic device, such as an image sensor or a camera, is displayed on a monitor or in a film for X-ray diagnosis, the image data is generally subjected to gradation conversion so that the image can be observed more easily.

For example, in a so-called two-point method, gradation conversion is performed such that a maximum pixel value and a minimum pixel value in an area subjected to gradation conversion processing (i.e., an object area) are set to constant densities. According to this method, the entire object area is displayed at a constant density range, so that the entire object area can be displayed with high reliability.

In addition, in a so-called one-point method, gradation conversion of, for example, an image of a chest radiographed from the front is performed such that a maximum pixel value in an area of the image corresponding to a lung depicted in the image is set to a constant density. More specifically, in the one-point method, gradation conversion is performed such that a pixel value in a target region in the object area, which is also called a characteristic region and refers to a specific anatomic region, is set to a predetermined density. According to this method, since the density in the target region is set to a predetermined density, diagnosis of the target region can be performed with high reliability.

On the other hand, a method of changing a dynamic range has been proposed by the inventors of the present invention (Japanese Unexamined Patent Application Publication No. 10-272283). More specifically, an image processing method according to this publication can be expressed by using coordinates (x, y) in an image, a gradation conversion function F1( ), a gradation conversion rate c(x, y), a pixel value fd(x, y) after the conversion, a first image f0(x, y), a second image f1(x, y), and a smoothed (low-frequency) image fus(x, y) of the second image, as follows:

$$fd(x,y)=f0(x,y)+(1-c(x,y))\times(f1(x,y))-fus(x,y) \quad \text{Equation (1)}$$

where f0(x,y)=F1(f1(x,y)), $$c(x, y) = \frac{\partial F1(f1(x, y))}{\partial f1(x, y)}$$

In this method, the dynamic range of the image is changed while high-frequency components are adjusted, so that the entire object area can be displayed in a film with good contrast without reducing the amplitude of fine structures.

In the above-described two-point method, since gradation conversion is performed such that the maximum and the minimum pixel values in the object area are set to constant densities, the concept of setting the density in the target region in the image to a predetermined density is not applied. Accordingly, there is a problem in that the density in the target region varies with each image.

In addition, in the above-described one-point method, although the density in the target region is set to a predetermined density, there is a problem in that the maximum and the minimum densities in the object area vary with each image depending on the width of a pixel value distribution (pixel value width) in the object area. For example, when gradation conversion of an image of a chest radiographed from the front is performed such that the maximum pixel value in a lung field is set to a constant density, the density in an abdomen region, where pixel values are low, varies with each image depending on the pixel value width of the object area. In addition, although the peripheral region of the lung field is also necessary for diagnosis, since this region is adjacent to the abdomen region and the pixel values are also low, the density in this region also varies with each image. Although gradation conversion is not necessarily performed such that the maximum and the minimum pixel values in the object area are set to constant densities as in the two-point method, it is undesirable for the contrasts in regions corresponding to the maximum and/or the minimum pixel values in the object area to vary significantly with each image depending on the pixel value width of the object area.

In addition, the above-described method of changing the dynamic range does not serve to solve the above-described problems of the one-point method and the two-point method. More specifically, the density in the target region, as well as in other regions cannot be prevented from varying with each image.

SUMMARY OF THE INVENTION

An object of the present invention is to solve the above-described problems while using the one-point method.

According to the present invention, the foregoing object is attained by providing a method of gradation conversion of a radiographic image of an object, the method including extracting (1) a predetermined region from the image, (2) a pixel value range in the predetermined region as a pixel value width, and (3) a representative pixel value of the object. A first gradation conversion is performed on the image such that the pixel value width is adjusted to a predetermined width, and a second gradation conversion is then performed on the image in which the first gradation conversion was performed, such that the representative pixel value is adjusted to a predetermined pixel value.

Further, the foregoing object is also attained by providing a computer-readable storage medium storing a program for making a computer execute a method of gradation conversion of a radiographic image of an object, the method including extracting, (1) a predetermined region from the image; (2) a pixel value range in the predetermined region as a pixel value width, and (3) a representative pixel value of the object. A first gradation conversion is performed on the image such that the pixel value width is adjusted to a predetermined width, and a second gradation conversion is then performed on the image in which the first gradation conversion was performed, such that the representative pixel value is adjusted to a predetermined pixel value.

Furthermore, the foregoing object is also attained by providing a system which includes a plurality of apparatuses and performs gradation conversion of a radiographic image, comprising means for extracting a predetermined region from the image, a pixel value range in the predetermined region as a pixel value width, and extracting a representative pixel value of the object. A first gradation conversion means performs gradation conversion on the image such that the pixel value width is adjusted to a predetermined width, and a second gradation conversion means then performs gradation conversion on the image in which the first gradation conversion was performed, such that the representative pixel value is adjusted to a predetermined pixel value.

Further objects, features and advantages of the present invention will become apparent from the following description of the preferred embodiments (with reference to the attached drawings).

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DESCRIPTION OF THE PREFERRED EMBODIMENTS

Preferred embodiments of the present invention will be described in detail in accordance with the accompanying drawings.

First Embodiment

Figure 1:
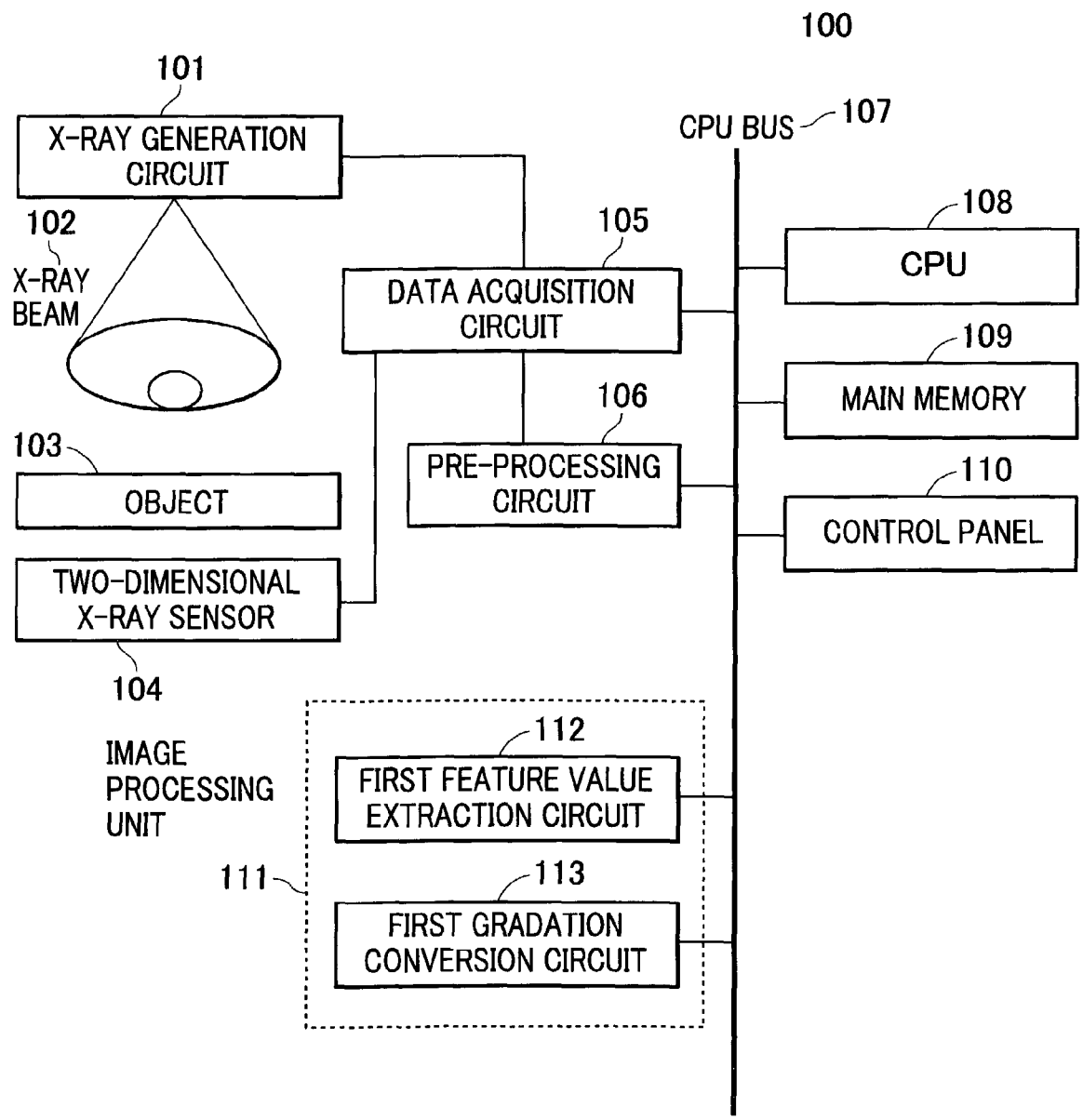
FIG. 1 is a block diagram showing the construction of an image processing apparatus according to a first embodiment of the present invention.

FIG. 1 shows an image processing apparatus 100 including a feature value extraction device according to a first embodiment of the present invention. More specifically, the image processing apparatus 100 is used for processing an X-ray image of an object 103 and has a density value conversion function. The image processing apparatus 100 includes a pre-processing circuit 106, an image processing unit 111, a CPU 108, a main memory 109, and a control panel 110 which communicate data with each other via a CPU bus 107.

Figure 2:
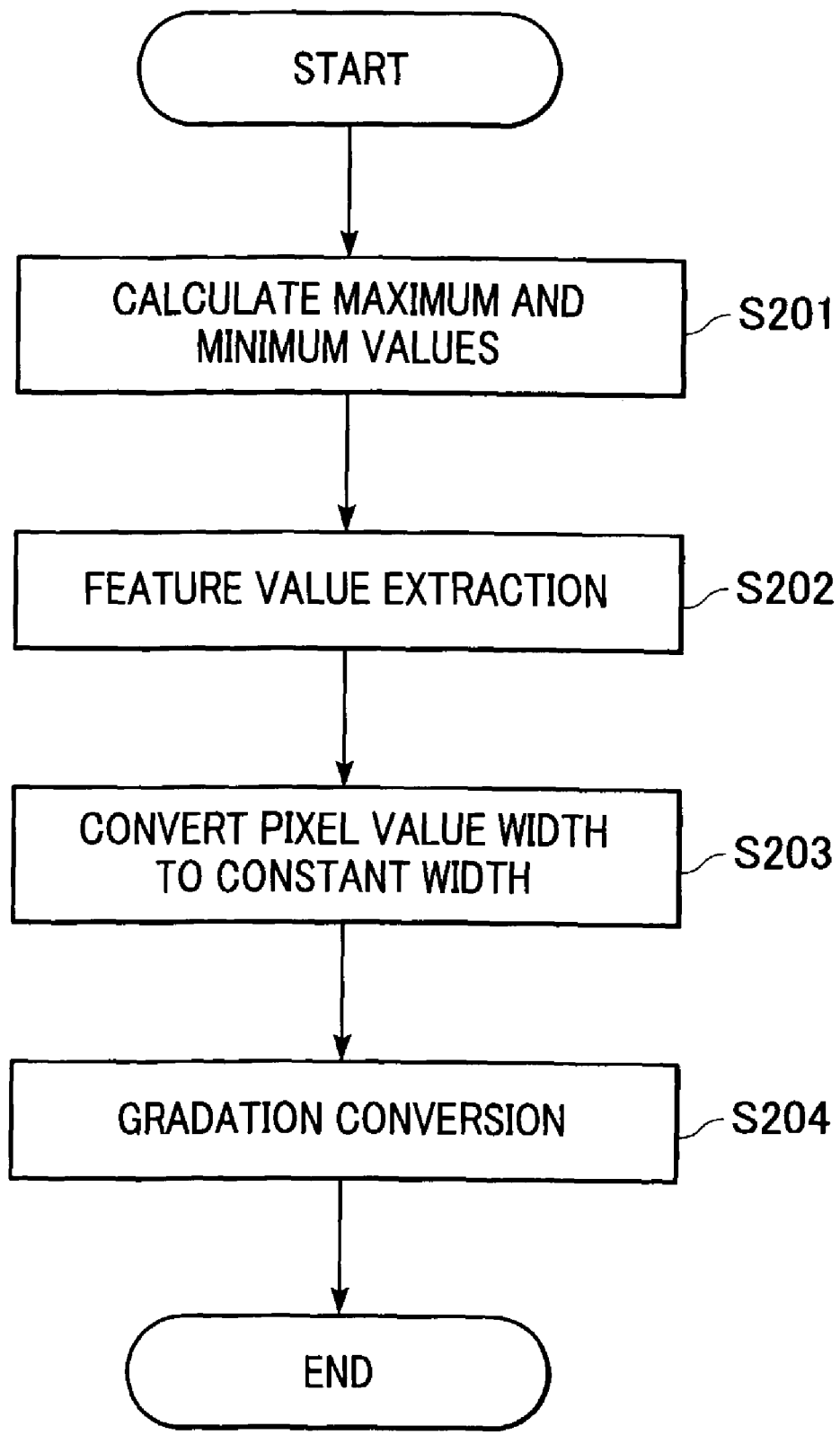
FIG. 2 is a flowchart showing a process performed by the image processing apparatus according to the first embodiment of the present invention.
Figure 3:
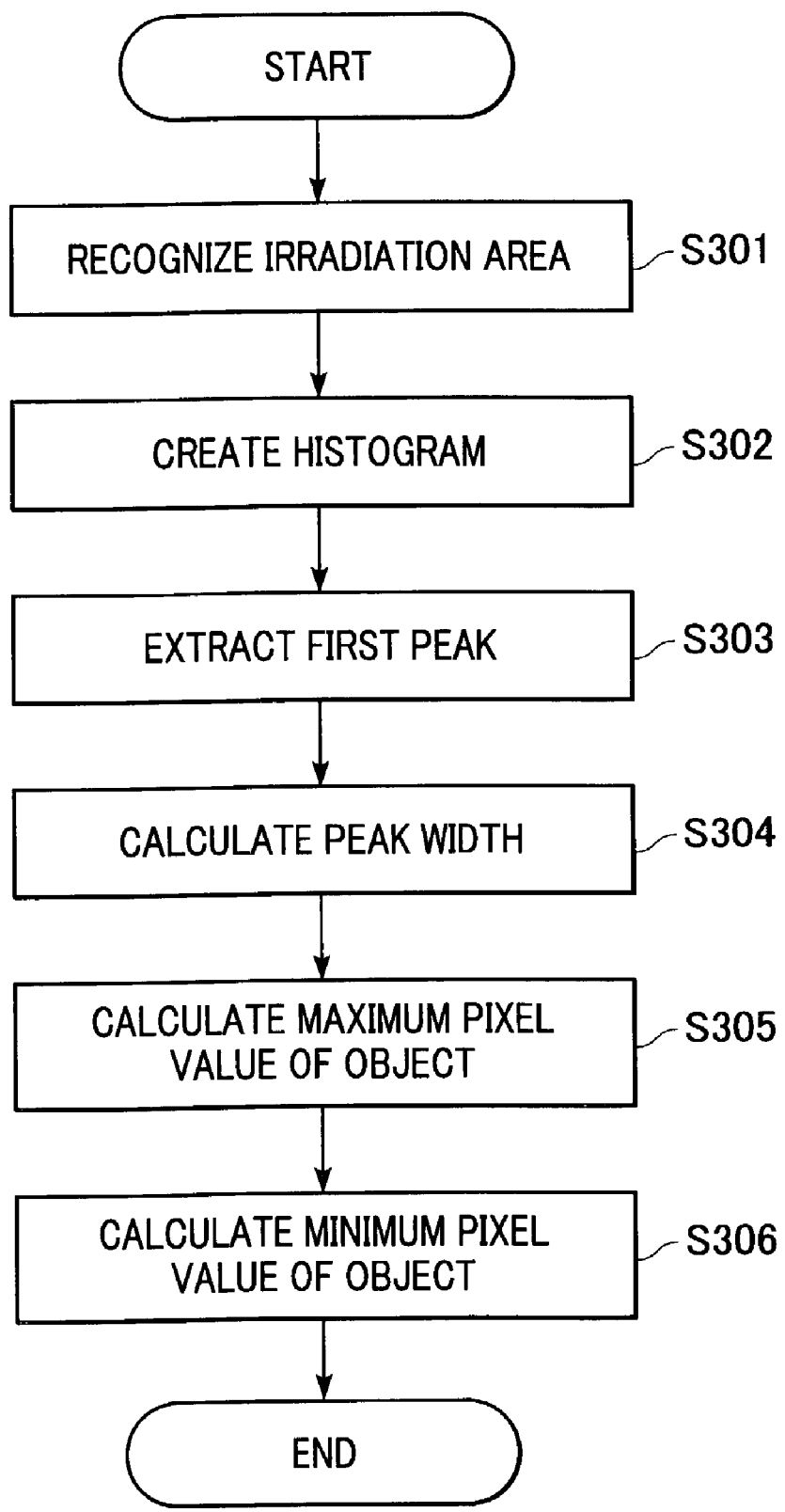
FIG. 3 is a flowchart showing a process of histogram analysis.
Figure 4:
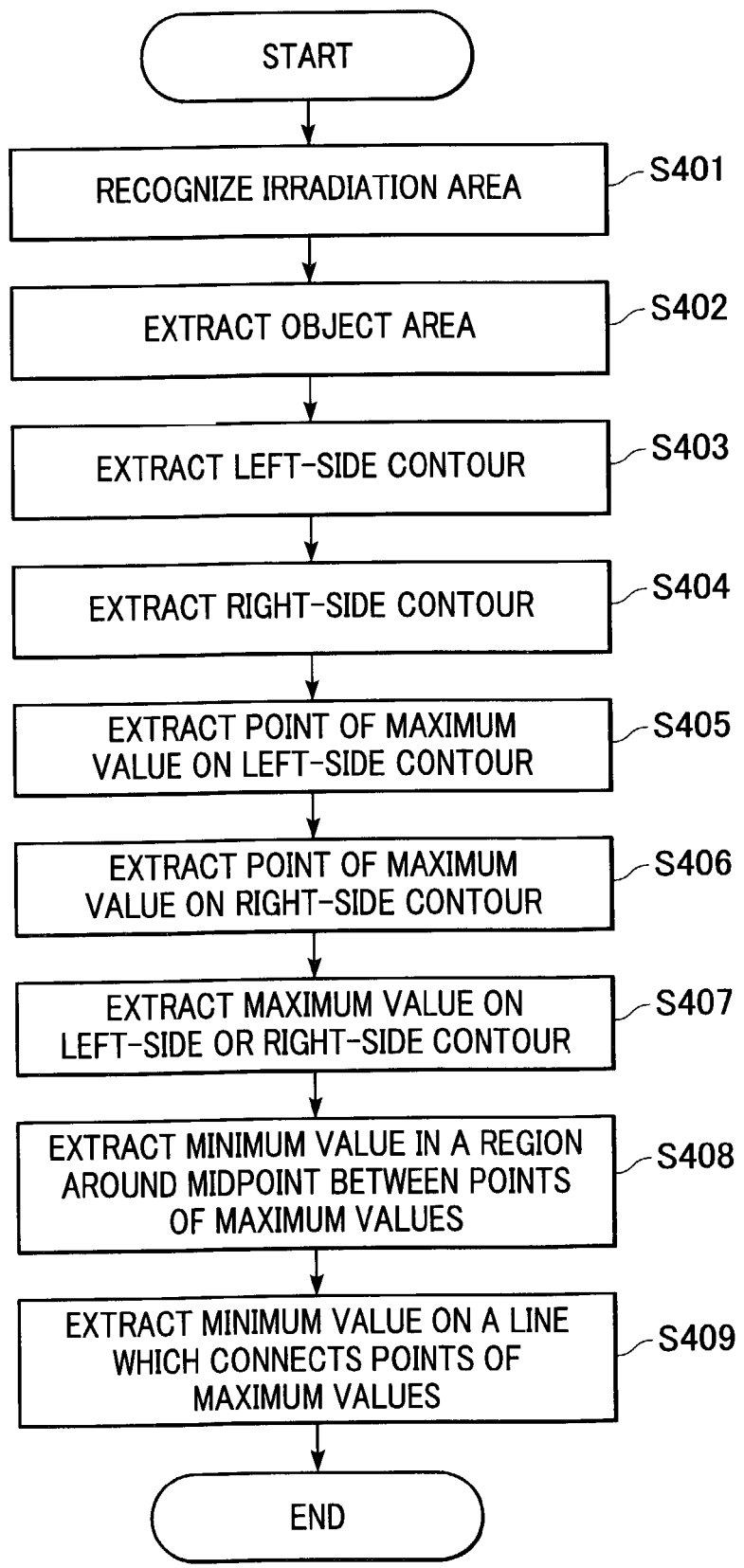
FIG. 4 is a flowchart showing a process of structural analysis.

In addition, the image processing apparatus 100 also includes a data acquisition circuit 105, which is connected to the pre-processing circuit 106, a two-dimensional X-ray sensor 104 and an X-ray generation circuit 101. The data acquisition circuit 105 and the pre-processing circuit 106 are also connected to the CPU bus 107. FIG. 2 is a flowchart showing a process according to the first embodiment which is performed by an image processing unit 111. FIG. 3 is a flowchart showing a process of calculating the maximum and the minimum pixel values in an object area of an image by using a histogram. FIG. 4 is a flowchart showing a process of extracting a feature pixel value from a target region in the object area (for example, a specific anatomic region) using structural analysis. FIGS. 2, 3, and 4 are described more fully below.

Figure 5:
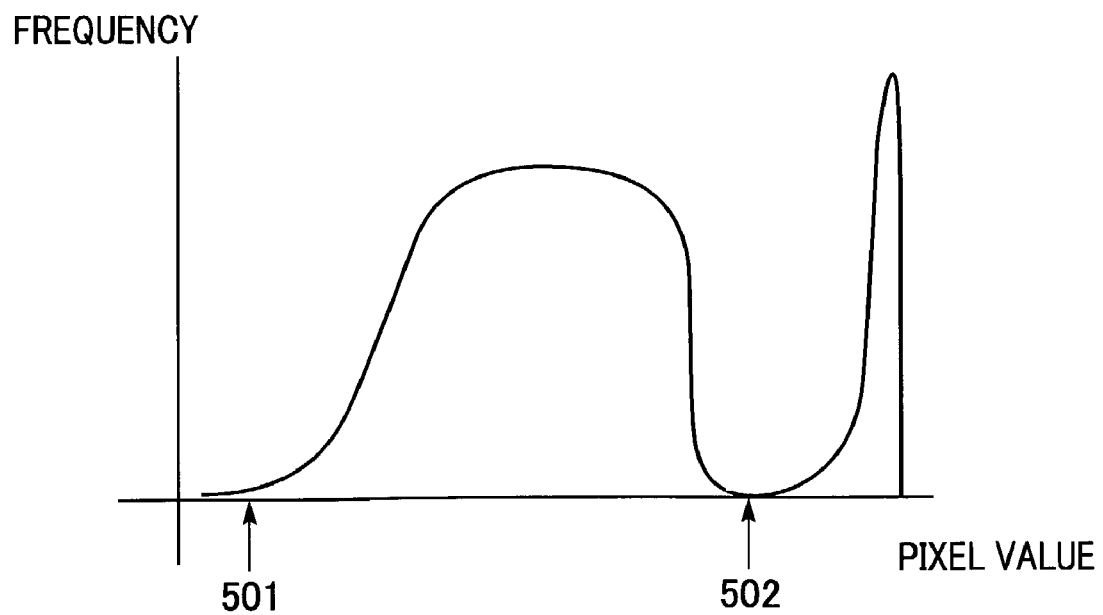
FIG. 5 is a diagram showing a histogram.
Figure 6:
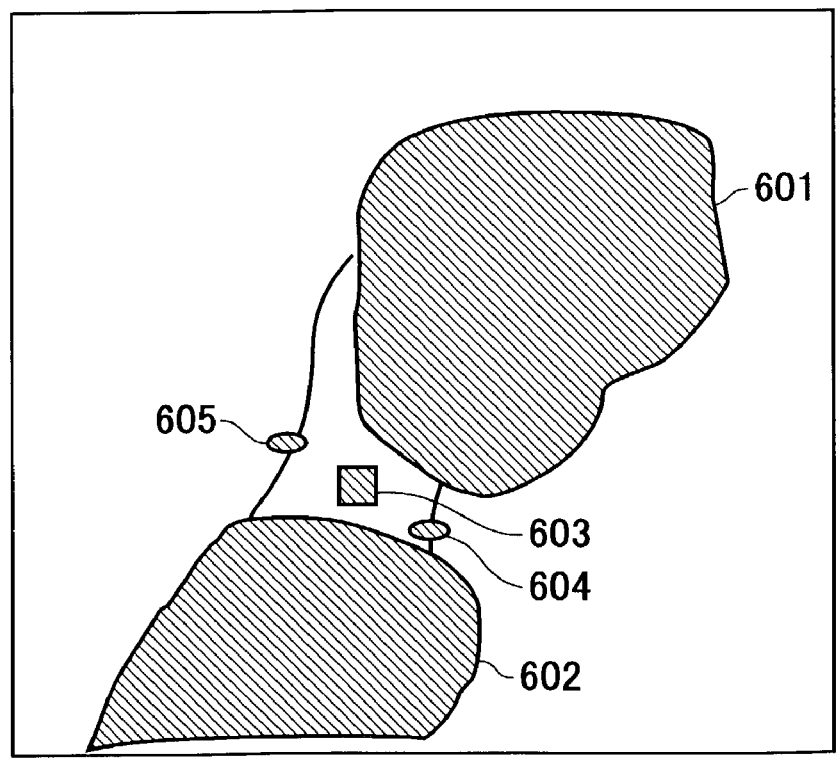
FIG. 6 is a diagram showing a feature point/region in an image of a cervical spine.

FIG. 5 is a diagram showing an example of a histogram which is subjected to histogram analysis. In FIG. 5, the horizontal axis shows the pixel value, and the vertical axis shows the frequency. FIG. 6 is a diagram showing an image of a cervical spine of an object as an example of an image which is subjected to the above-described process of calculating the feature value by structural analysis.

In FIG. 6, reference numeral 601 denotes a head region, reference numeral 602 denotes a shoulder region and reference numerals 604 and 605 denote points where the pixel value is maximum on the right and left contours of the object area, respectively. In addition, reference numeral 603 denotes the target region from which the feature value is extracted and which includes a point where the pixel value is minimum in a region of interest (a region corresponding to a neck of the object in this case). Since the X-ray transmittance is low at the head region 601 and the shoulder region 602, pixel values at these regions in acquired image data are lower than those at a throat region and a through area (i.e., an area where the two-dimensional X-ray sensor 104 is directly irradiated with the X-ray), which will be described below. In this case, the pixel values are low at regions where the X-ray transmittance is low and are high at regions where the X-ray transmittance is high. However, it is easy for those skilled in the art to formulate the inverse relationship.

In the above-described image processing apparatus 100, the main memory 109 stores various data necessary for processes performed by the CPU 108. In addition, the main memory 109 includes a working memory (not shown) used by the CPU 108. The CPU 108 controls the overall operation of the apparatus in accordance with commands input from the control panel 110 by using the main memory 109. The operation of the image processing apparatus 100 will be described below.

An X-ray beam 102 is emitted from the X-ray generation circuit 101 toward a test piece (also called a target or an object) 103. The X-ray beam 102 emitted from the X-ray generation circuit 101 is attenuated when it passes through the object 103, and is received by the two-dimensional X-ray sensor 104. Then, the two-dimensional X-ray sensor 104 outputs X-ray image data (also called an X-ray image) based on the received X-ray beam 102. In the first embodiment, an image of a cervical spine of a human body is considered as an example of the X-ray image output from the two-dimensional X-ray sensor 104.

The data acquisition circuit 105 receives the X-ray image output from the two-dimensional X-ray sensor 104, converts it into an electric signal, and supplies the signal to the pre-processing circuit 106. The pre-processing circuit 106 performs processes such as offset correction and gain correction of the signal (X-ray image signal) obtained from the data acquisition circuit 105. After the pre-processing, the X-ray image signal is transmitted from the pre-processing circuit 106 to the main memory 109 and to the image processing unit 111 via the CPU bus 107 under the control of the CPU 108 as an input image.

With reference to FIG. 1, the image processing unit 111 includes a first feature value extraction circuit 112 and a first gradation conversion circuit 113. The first feature value extraction circuit 112 calculates the maximum and the minimum pixel values in the object area or in the region of interest and the feature value of the target region in the object area. The first gradation conversion circuit 113 performs gradation conversion of the image on the basis of the maximum and the minimum pixel values and the feature value calculated by the first feature value extraction circuit 112.

Next, the operation of the image processing unit 111 will be described below with reference to FIGS. 2, 3, and 4. When the first feature value extraction circuit 112 receives the input image from the pre-processing circuit 106 via the CPU bus 107 under the control of the CPU 108, the first feature value extraction circuit 112 calculates the maximum and the minimum pixel values in the object area or in the region of interest (for example, the neck region) (S201). Next, the feature value (feature value of the target region in the object area) necessary for gradation conversion is extracted, or calculated (S202). When, for example, the neck region (cervical spine region) is diagnosed, the cervical spine region is mainly observed, but soft tissue region is also necessary for diagnosis. Accordingly, it is necessary that the cervical spine region be displayed at a predetermined density and the density in the soft tissue region be within a predetermined density range at the same time. In the following description, both the case in which the density in the entire object area including the head area is set to a predetermined density and the case in which only the density in the neck region is set to a predetermined density will be explained.

Gradation conversion in which the density in the entire object area is set to a predetermined density will be described below with reference to FIG. 3. First, the first feature value extraction circuit 112 extracts an area of the image which is irradiated with the X-ray (irradiation area) by any suitable method, such as a thresholding method, a histogram-analyzing method, an edge extraction method, or the like (S301). Then, the first feature value extraction circuit 112 creates a histogram (FIG. 5) of the irradiation area of the image (S302). Then, the first feature value extraction circuit 112 extracts a peak in a high pixel value area of the histogram (S303). More specifically, the peak is determined by searching for a group of three successive points where the midpoint has the highest frequency and the other two points have frequencies lower than that of the midpoint. This peak corresponds to an area where the two-dimensional X-ray sensor 104 is directly irradiated with the X-ray (also referred to as a through area). Then, the half-width at half maximum at this peak of the histogram is calculated (S304), and the pixel value at a point 502 where the frequency is minimum in a pixel-value range lower than a pixel value obtained by subtracting the half-width from the pixel value at the peak is determined as the maximum pixel value of the object (S305). In addition, the minimum pixel value in the histogram, that is, the pixel value at a point 501, is determined as the minimum pixel value of the object (S306). Accordingly, the maximum and the minimum pixel values of the object can be reliably calculated by using the histogram.

Next, the process of calculating the feature value of the target region in the neck region by structural analysis, which is also performed by the first feature value extraction circuit 112, will be described below with reference to FIG. 4. First, the irradiation area is extracted (S401). Then, the object area is extracted by changing the pixel values at areas outside the irradiation area, the through area in the irradiation area and the peripheral area of the object area which adjoins the through area and has a constant width to, for example, zero (S402). More specifically, image conversion expressed by the following equation is performed:

$$f1(x, y) = f(x, y) \times \prod_{x1=-d1}^{x1=d1} \prod_{y1=-d2}^{y1=d2} \text{sgn}(x + x1, y + y1) \quad \text{Equation (2)}$$

where f(x, y) is image data, f1(x, y) is an image which remains after the through area and the area adjoining the through area are excluded, and sgn(x, y) is expressed as follows:

sgn(x, y)=0 when f(x, y)≧Th1, and sgn(x, y)=1 in other cases, where Th1 is a constant which is determined experientially. For example, Th1 is 90% of the maximum pixel value. In addition, d1 and d2 are constants which determine the width of the peripheral area of the object which is to be excluded.

Next, the contour of the area where the pixel values f1 (x, y) are not changed to zero is extracted. More specifically, the left contour is defined by coordinates which are obtained by scanning each of the horizontal lines of pixels from the left end and detecting the coordinates where the pixel value f1(x, y) changes from a zero value to a non-zero value (also called "change coordinates"). Similarly, the right contour is defined by coordinates which are obtained by scanning each of the horizontal lines of pixels from the right end and detecting the coordinates where the pixel value f1(x, y) changes from a zero value to a non-zero value. When the change coordinates cannot be found, coordinates at the end of the image at which the scanning is started are determined as the contour for convenience (S403 and S404). Accordingly, the left and the right contours of the object area are determined.

Next, the first feature value extraction circuit 112 extracts a point 605 on the left contour where the pixel value is maximum (S405). Similarly, the first feature value extraction circuit 112 also extracts a point 604 on the right contour where the pixel value is maximum (S406). Then, the maximum pixel values on the left and the right contours are compared, and the larger pixel value is determined as the maximum pixel value in the region of interest, that is, the neck region in this case (S407). Then, the first feature value extraction circuit 112 extracts the minimum pixel value in a square region (e.g., target region 603) having a predetermined size which is centered on the midpoint of a line segment connecting the extracted points 605 and 604 as the minimum pixel value in the neck region (S408). The predetermined size can be preset based on a size of a target region (e.g., a region of cervical vertebrae).

Then, the first feature value extraction circuit 112 extracts a square region having a predetermined size which is centered on a point on the line segment connecting the extracted points 605 and 604 where the pixel value is minimum as the target region 603, and extracts a statistical value (an average value, a minimum value, etc.) of the pixel values in the target region 603 as the feature value (feature pixel value) (S409).

Next, the first gradation conversion circuit 113 performs, for example, linear gradation conversion such that the difference between the maximum and the minimum pixel values (pixel value width) determined by the above-described processes is set to a constant value by using a first gradation conversion function (S203). In addition, the first gradation conversion circuit 113 also performs another gradation conversion such that a pixel value obtained by converting the above-described feature value with the first gradation conversion function is set to a constant density by using a second gradation conversion function (S204). The second gradation conversion function is described more fully below.

In the case in which the maximum and the minimum pixel values are extracted from the object area, the following advantages can be obtained. That is, even when the pixel value width of the entire object area is large and cannot be reduced to a pixel value range (density range, brightness range, etc.) at which the image can be displayed with good contrast in an image display medium, such as a film or a cathode ray tube (CRT) monitor, by a known method, the entire object area can be displayed at the pixel value range which ensures good contrast by reducing the pixel value width to a constant width. Accordingly, diagnosis of the image can be performed easily. On the contrary, when the pixel value width of the entire object area is small, the contrast in the object area can be increased by increasing the pixel value width to the constant width, and the above-described effect can also be obtained in this case.

In addition, since gradation conversion is also performed such that the density in the target region, from which the feature value is extracted, is set to a constant density, the target region can be displayed in the image display medium at a predetermined pixel value (density, brightness, etc.), or target level. Accordingly, the region which is important for diagnosis can be displayed at a pixel value or target pixel value level suitable for diagnosis. In addition, since the maximum and the minimum pixel values of the object area are not fixed to constant densities, individual differences between objects can be displayed in the image display medium, such as a film, as in the case of using a conventional film-screen system. Accordingly, the target region can be displayed at a predetermined density as in the case of using a conventional film-screen system, and the entire object area can be reliably displayed in the image display medium, such as a film, at the pixel value range which ensures good contrast.

In addition, in the case in which gradation conversion is performed such that the difference between the maximum and the minimum pixel values in the region of interest, such as the neck region, is set to a constant value, the region of interest can be displayed in the image display medium, such as a film, at a constant pixel value width (density width, etc.). In this case, the density range in the neck region can be increased in comparison to the case in which the object area is displayed at a constant density range. Accordingly, diagnosis of the region of interest can be more reliably performed. Therefore, this type of gradation conversion is particularly advantageous when it is more important to increase the reliability of diagnosis of the region of interest rather than that of the entire object area.

As described above, according to the first embodiment of the present invention, gradation conversion of the target image is performed such that the difference between the maximum and the minimum pixel values in the entire object area or in the region of interest is set to a constant value. Therefore, the object area or the region of interest can be displayed in the image display medium at a pixel value range which ensures good contrast, irrespective of the object. Accordingly, many kinds of objects can be diagnosed with high reliability. In addition, since gradation conversion of the target image is also performed such that the target region is displayed in the image display medium at a predetermined pixel value, the region which is important for diagnosis can be displayed at a pixel value suitable for diagnosis. Accordingly, the reliability of diagnosis can be further increased. Furthermore, since the maximum and the minimum pixel values of the object area are not fixed to constant values and only the pixel value width of the object area is set to a constant value, the characteristics of each object (individual differences) can be displayed in the image display medium, so that diagnosis similar to the case of using a conventional film-screen system can be performed.

The above-described first gradation conversion function may be, for example, a linear function which increases or decreases the pixel value width of the target image. In addition, the following equation can be used as the second gradation conversion function:

$$D(x) = D_{min} + \frac{D_{max} - D_{min}}{2}\left\{\frac{1}{1+\exp(c(x_0 - (x-d)))} + \right.$$

Equation (3)

-continued
$$\left.\frac{1}{1+\exp(a \times c(b \times x_0 - (x-d)))}\right\}$$

where x is an input pixel value, D(x) is an output density, $D_{max}$ and $D_{min}$ are maximum and minimum output densities, respectively, c is a gradient, a, b, and $x_0$ are constants and d is a variable for adjusting a parallel displacement. In this gradation conversion function, the inclination of the function increases and decreases along with the gradient c. In addition, when only the gradient c is changed, the inclination can be changed around a center point $(x_c, D(x_c))$ which satisfies $D(x_c)=(D_{max}+D_{min})/2$. In this case, $x_c$ can be given as $x_c=(x_0(1+ab))/(1+a)+d$. In addition, in this function, the density asymptotically approaches the maximum density as x increases, and asymptotically approaches the minimum density as x decreases. The density level in the target region can be adjusted by setting the constant d in Equation (3) such that the feature value (pixel value) of the target region is converted to a predetermined density.

Although the first and the second gradation conversion functions are sequentially applied to the target image in the above-described example, a composite function of the first and the second gradation conversion functions may also be used. In this case, when $D_1(x)$ and $D_2(x)$ are the first and the second gradation conversion functions, respectively, the composite function $D_c(x)$ can be expressed as $D_c(x)=D_2(D_1(x))$.

Second Embodiment

A known image processing apparatus processes an image on the basis of a specific algorism (for example, the one-point method). According to a second embodiment, the effects similar to those of the first embodiment can be obtained by using a known image processing apparatus.

Figure 7:
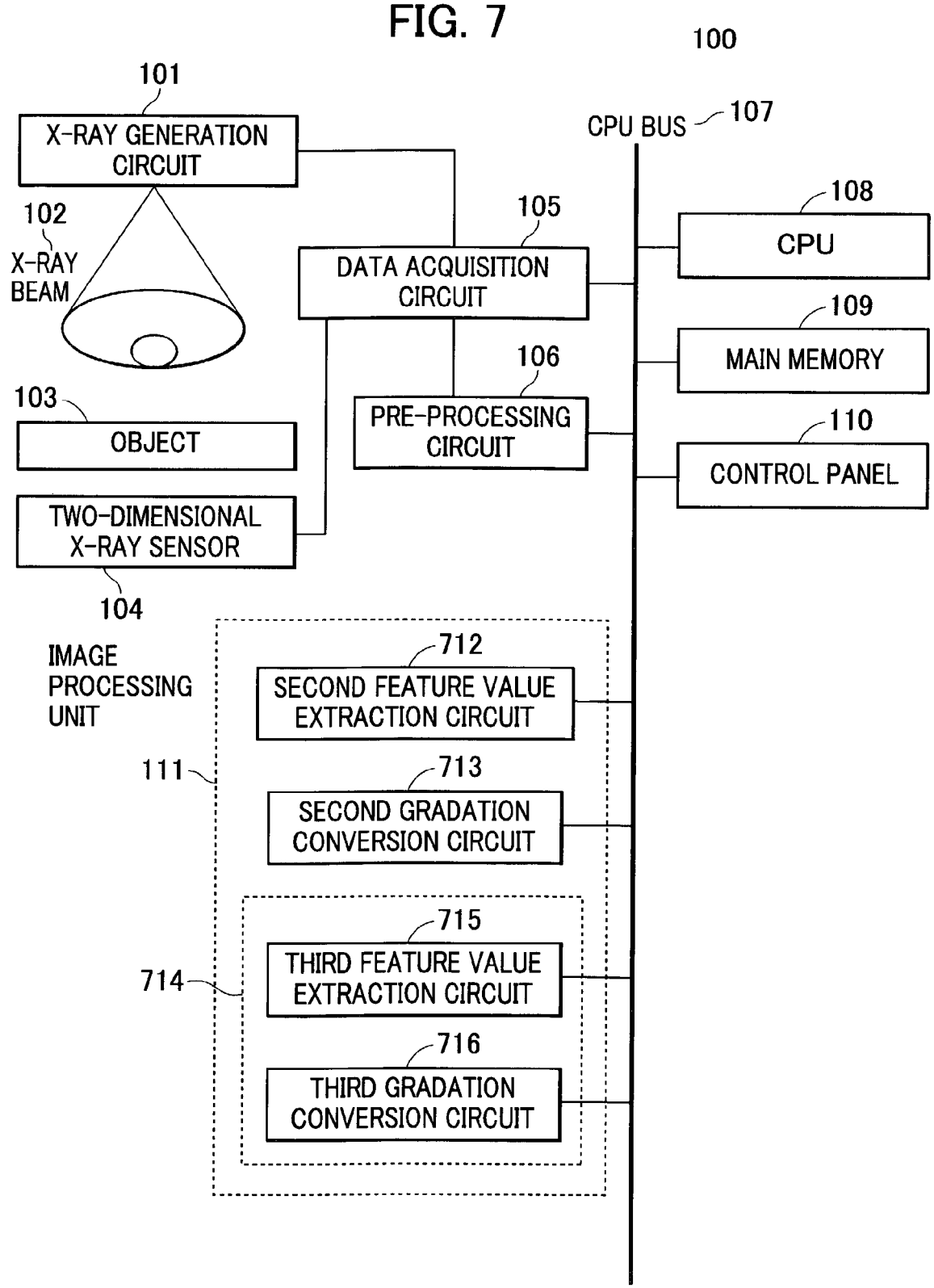
FIG. 7 is a block diagram showing the construction of an image processing apparatus according to a second embodiment of the present invention.
Figure 8:
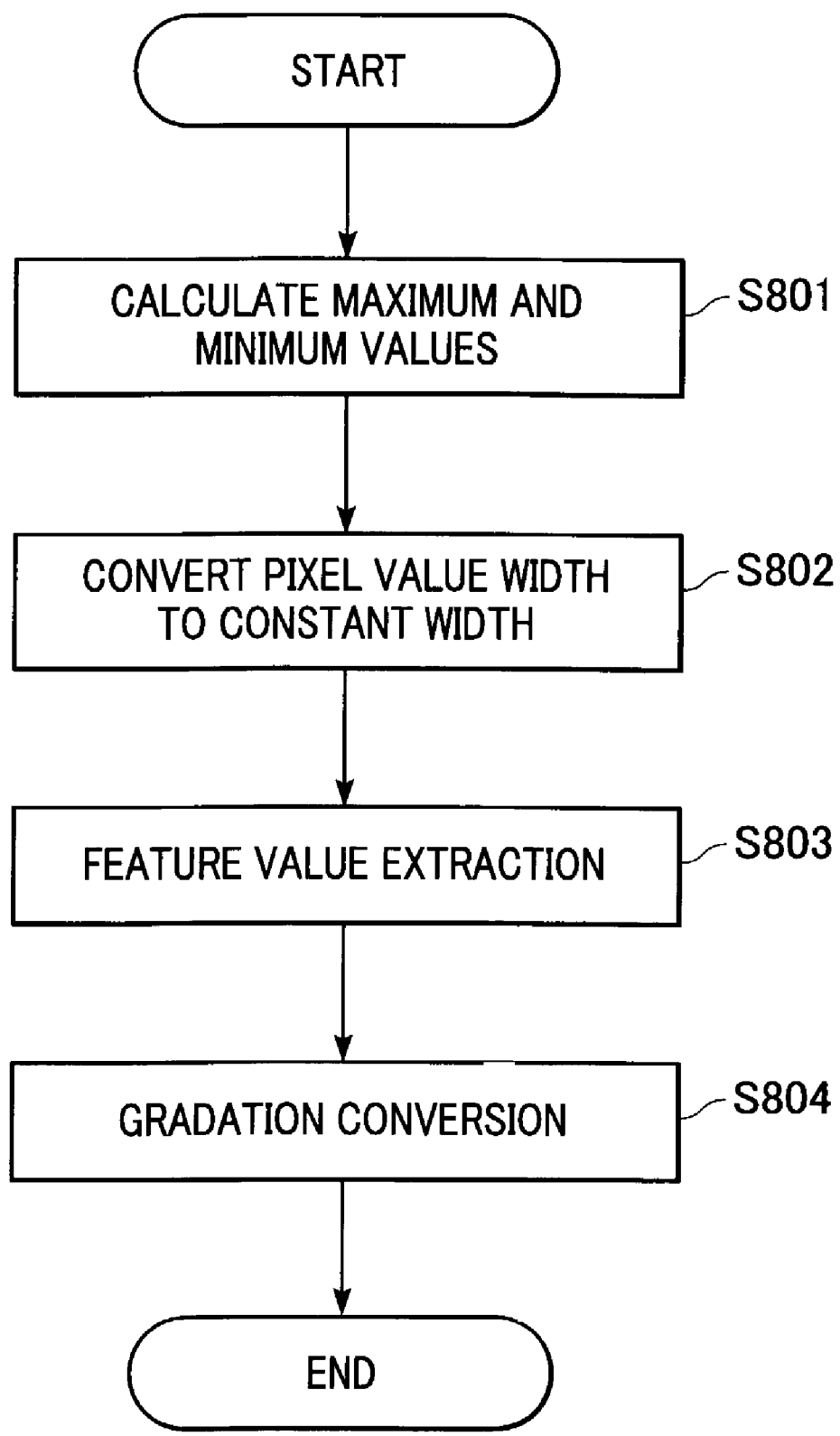
FIG. 8 is a flowchart showing a process performed by the image processing apparatus according to the second embodiment of the present invention.

FIG. 7 is a diagram showing the construction of an image processing apparatus according to the second embodiment, and FIG. 8 is a flowchart showing a process according to the second embodiment. Components similar to those of the first embodiment are denoted by the same reference numerals, and detailed explanations thereof are thus omitted.

In FIG. 7, reference numeral 712 denotes a second feature value extraction circuit which calculates the maximum and the minimum pixel values in the object area or in the region of interest. Reference numeral 713 denotes a second gradation conversion circuit which performs gradation conversion of the original image (target image) such that the pixel value width determined on the basis of the maximum and the minimum pixel values calculated by the second feature value extraction circuit 712 is set to a constant value. In addition, reference numeral 714 denotes a known image processing apparatus using the one-point method which includes a third feature value extraction circuit 715 and a third gradation conversion circuit 716. The third feature value extraction circuit 715 calculates (extracts) the feature value of the target region in the object area. The third gradation conversion circuit 716 performs gradation conversion in correspondence with the characteristics of an image display medium, such as a film, on the basis of the feature value calculated by the third feature value extraction circuit 715.

Next, the process according to the second embodiment will be described below with reference to FIG. 8. Similar to the first embodiment, the second feature value extraction circuit 712 calculates the maximum and the minimum pixel values in the object area or in the region of interest by histogram analysis or structural analysis (S801). Next, the second gradation conversion circuit 713 changes the pixel value width of the target image on the basis of the maximum and the minimum pixel values calculated by the second feature value extraction circuit 712 (S802). When, for example, the difference between the maximum and the minimum pixel values is less than a predetermined value, the pixel value width is increased such that the difference is increased to the predetermined value. On the contrary, when the difference between the maximum and the minimum pixel values is more than the predetermined value, the pixel value width is decreased such that the difference is decreased to the predetermined value.

Then, the image obtained from the second gradation conversion circuit 713 is subjected to the feature value extraction process performed by the third feature value extraction circuit 715, which calculates the feature value of the target region in the object area. Then the image is subjected to the gradation conversion process performed by the third gradation conversion circuit 716, which performs gradation conversion in correspondence with the characteristics of the image display medium on the basis of the feature value calculated by the third feature value extraction circuit 715 (S803 and S804).

As described above, according to the second embodiment, the maximum and the minimum pixel values in the object area, or in the region of interest of the original image, are calculated and the pixel value width of the original image is adjusted to a predetermined value in advance. The obtained image is then processed by the known image processing apparatus (gradation conversion unit). More specifically, the image obtained by adjusting the pixel value width of the object area or the region of interest to a constant value according to the first embodiment is then processed by a feature value extraction circuit and the gradation conversion circuit of the known image processing apparatus. Thus, according to the second embodiment, the effects of the first embodiment can be obtained by using a known image processing apparatus, and it is not necessary to modify the known image processing apparatus.

As described above, according to the first and the second embodiments of the present invention, the target image can be reliably displayed in an image display medium such that the target region is displayed at a predetermined pixel image value and the object area or a predetermined region in the object area is displayed at a pixel value range which ensures good contrast.

Other Embodiments

It is to be understood that the object of the present invention can also be achieved by supplying a storage medium storing program code of software for implementing the functions of the apparatus or system according to the first or second embodiment so that a computer (CPU, MPU, etc.) of the apparatus or system reads and executes the program code stored in the storage medium.

In that case, the program code itself, read from the storage medium, achieves the functions of the first or second embodiment, and thus the storage medium storing the program code and the program code itself constitute the present invention.

The storage medium for providing the program code may be, for example, a ROM, a floppy disk, a hard disk, an optical disk, a magneto-optical disk, a CD-ROM, a CD-R, a magnetic tape, a non-volatile memory card, etc.

Furthermore, the functions of embodiments of the present invention may be achieved not only by the computer reading and executing the program code, but also by the computer executing part of or the entire process, utilizing an OS, etc. running on the computer, based on instructions of the program code. The latter is also one of embodiments of the present invention.

Furthermore, the program code read from the storage medium may be written to a memory of a function extension board inserted in the computer or a function extension unit connected to the computer. The functions of the first or second embodiment may be realized by executing part of or the entire process by a CPU, etc. of the function extension board or the function extension unit based on instructions of the program code. This is also one of embodiments of the present invention.

When the present invention is applied to a program or a storage medium storing the program, the program includes, for example, program code corresponding to at least one of the flowcharts shown in FIGS. 2, 3, 4 and 8 explained above.

It is to be understood that the present invention may also be applied to a system including a plurality of apparatuses (e.g., radiation generating apparatuses, radiographic apparatuses, image processing apparatuses, and interface apparatuses, etc.) and to a single apparatus in which functions of these apparatuses are integrated. When the present invention is applied to a system including a plurality of apparatuses, the apparatuses communicate with one another via, for example, electrical, optical, and/or mechanical means, and/or the like.

Furthermore, the present invention may also be applied to an image diagnosis aiding system including a network (LAN and/or WAN, etc.).

The present invention thus achieves the above-described object.

The present invention is not limited to the above embodiments and various changes and modifications can be made within the spirit and scope of the present invention. Therefore to apprise the public of the scope of the present invention, the following claims are made.

What is claimed is:

1. An image processing method implemented by a computer comprising the steps of:
    extracting an object area within an original image;
    extracting a maximum pixel value and a minimum pixel value from the extracted object area;
    performing gradation conversion on the original image such that a pixel value width determined on the basis of the maximum and the minimum pixel values are adjusted to a predetermined width;
    extracting a target region of a cervical spine, by determining a minimum value on a line segment connecting a pixel showing a maximum value on a contour of one side of a body region and a pixel showing a maximum value on a contour on the other side of the body region;
    calculating a feature value of the target region; and
    performing a second gradation conversion based on the feature value.

* * * * *